United States Patent [19]

Campau

[11] Patent Number: 4,948,095
[45] Date of Patent: Aug. 14, 1990

[54] SHUT-OFF VALVE

[75] Inventor: Daniel N. Campau, Grand Rapids, Mich.

[73] Assignee: Flow-Rite Controls, Ltd., Grand Rapids, Mich.

[21] Appl. No.: 344,000

[22] Filed: Apr. 26, 1989

Related U.S. Application Data

[63] Continuation of Ser. No. 195,810, May 19, 1988, abandoned.

[51] Int. Cl.$^5$ .............................................. F16K 5/04
[52] U.S. Cl. .................................... 251/180; 251/185; 251/304
[58] Field of Search ............... 251/180, 181, 185, 287, 251/304; 137/614.21, 857

[56] References Cited

U.S. PATENT DOCUMENTS

| | | | |
|---|---|---|---|
| 1,798,473 | 3/1931 | Kiley | 251/287 X |
| 2,312,601 | 3/1943 | Stillwagon, Jr. | 251/185 X |
| 2,997,273 | 8/1961 | Nilsen | 251/185 |
| 3,831,628 | 8/1974 | Kintner et al. | 137/857 X |
| 3,997,009 | 12/1976 | Fox | 137/857 X |
| 4,244,393 | 1/1981 | Lehtinen | 251/185 X |
| 4,589,441 | 5/1986 | Campau | 137/512 |

FOREIGN PATENT DOCUMENTS 469878  3/1952  Italy .................... 251/181

Primary Examiner—John C. Fox
Attorney, Agent, or Firm—Niro, Scavone, Haller & Niro, Ltd.

[57] ABSTRACT

A plastic spring loaded shut-off valve for drains in live wells of boats seals without the presence of fluid pressure. This effect is achieved by a biasing spring urging sealing flaps against the valve ports. The flaps are curved and have ribbed edges to accomplish such sealing and prevent jamming of the ports. The biasing spring is secured to a rotating member through slots while the flaps are secured to the member by buttons. The spring and flap are also secured by a bar across the flap, which has a bearing pad where it is contacted by the spring. The rotating member is rotatable on the underside of the valve top screwed to the valve body. Stops on the inside of the valve top limit its rotation.

9 Claims, 1 Drawing Sheet

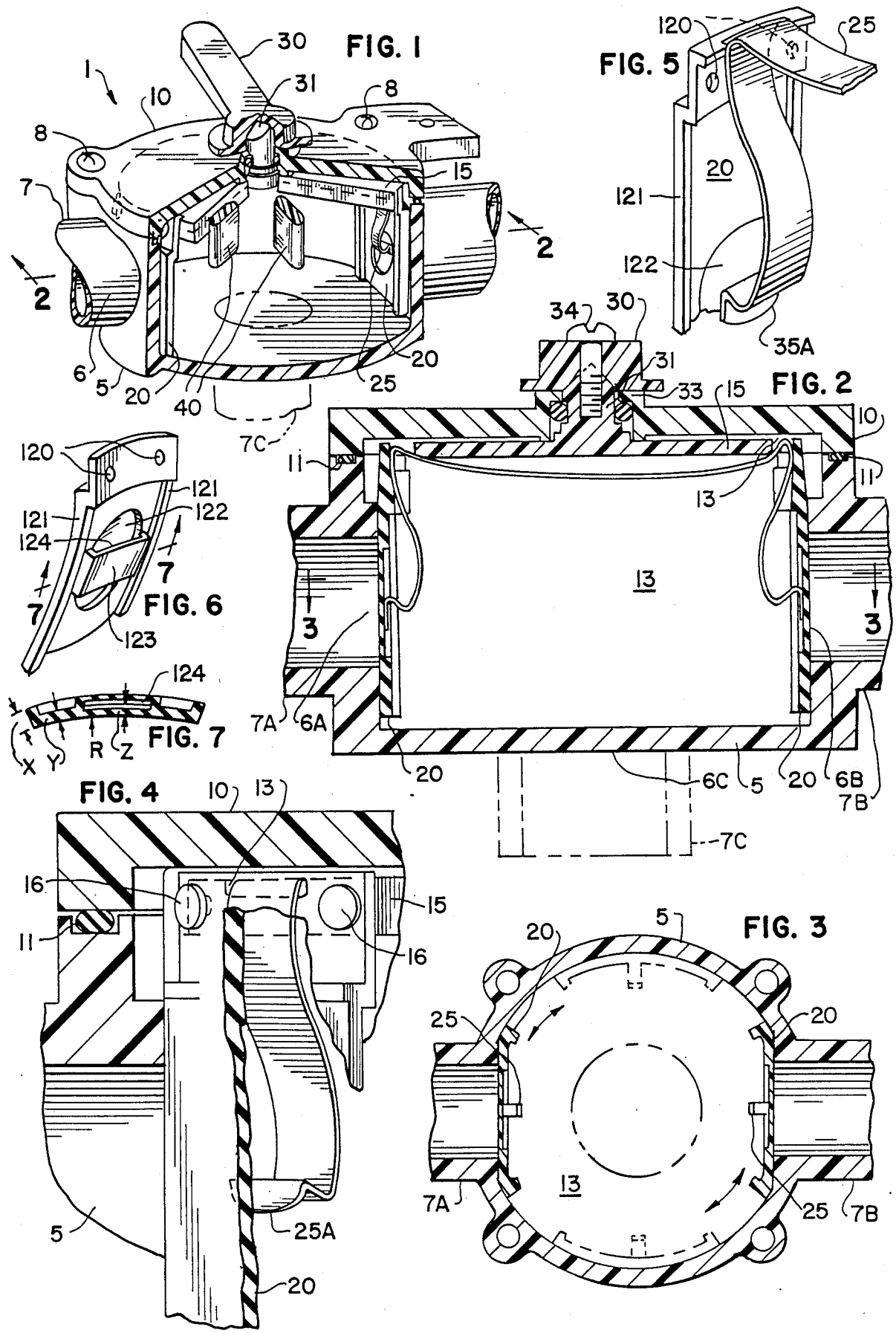

SHUT-OFF VALVE

This is a continuation of co-pending application Ser. No. 195,810 filed on 5-19-88, now abandoned.

BACKGROUND OF THE INVENTION

This invention relates generally to shut-off valves used for fluid flow control in low pressure applications. The present invention is particularly useful in fishing vessels such as bass fishing boats, and may be used to drain live wells, such as those described in U.S. Pat. No. 4,708,084 to Campau.

Shut-off valves that are presently used to drain live wells suffer from several drawbacks. Metallic valves, which are typically ball valves, have corrosion problems customarily found in a marine environment. A substantial actuation force is required to close the valve because of friction between the ball and the valve seat. The longer the ball sits, the greater the friction with the seat becomes, and thus the greater the actuation force necessary to unseat the ball.

An attempt to solve this problem has been made by using a plastic ball in the valve. The use of the ball valve still has inherent shortcomings, however. For example, the ball valve is typically actuated by a cable whose force must operate through a stroke of 90°, with minimum mechanical advantage at the ends of the stroke, where frictional resistance is greatest. The frictional resistance increases over time as the ball compresses the soft seat. This often leads to break-away forces which may be 10 or more times the force required to move the valve once the "stiction" force is overcome.

To compensate for the higher actuation force and to minimize the control cable strength and stiffness requirements, the valve ports are often made smaller than desirable, to reduce the force necessart to move the ball. This restricts flow through the valve, significantly reducing the drain rate in livewell applications and leads to increased chance of clogging by debris in the livewell water.

Another problem is that ball valves, or gate valves that would be similarly used, required precision manufacturing. The more precise the manufacturing operation is, the more expensive the item becomes.

SUMMARY OF THE INVENTION

The present invention is directed to an improved valve for use in controlling liquid flows, particularly in relatively low pressure applications. In accordance with the present invention, the improved valve includes a cylindrical body, having a top, bottom and cylindrical sidewall which defines a valve chamber. The valve also includes two or more ports in fluid communication with the valve chamber and at least one flexible sealing flap adapted to cover one port and seal against the sidewall to prevent flow from the chamber through the port. In one embodiment of the present invention the sealing flap is urged against the sidewall by a biasing spring. In another embodiment of the invention the sealing flap has a convex surface facing the interior of the valve chamber. In both embodiments the sealing characteristics of the valve are enhanced, particularly in low pressure applications.

One feature of the preent invention, therefore, is to use spring loaded flaps to enhance the sealing function.

Another feature of the shut-off valve resides in the construction of the flaps. The flaps are to include a convex configuration and may also include ribbed edges. This construction also improves the sealing of the ports.

The combination of the spring loading and the flap construction can be used to improve the sealing characteristics of existing valves, such as my own live well control valve described in U.S. Pat. No. 4,589,441.

The present valve can also be used to control the draining of water on a boat with fore and aft live wells while using only one valve. Furthermore, by eliminating the preloading springs and rotation feature, the shut-off valve can be converted into a three port, double check valve as required in the invention disclosed in my simultaneously filed copending application, Ser. No. 195,811, which issued as U.S. Pat. No. 4,832,073, relating to a system for filling a baitwell.

BRIEF DESCRIPTION OF THE DRAWINGS

The novel features which are believed to be characteristic of the invention are set forth in the appended claims. The invention itself, however, together with further objects and attendant advantages thereof, will best be understood by reference to the following description taken in connection with the accompanying drawings, in which:

FIG. 1 shows a perspective view of the valve with a section of the valve body cut away for easier visibility;

FIG. 2 is an elevation section through lines 2—2 of FIG. 1 at the center of the valve body showing the valve with the flaps and spring in a sealing position;

FIG. 3 is a plan view through section 3—3 of FIG. 2 with the open valve position shown in phantom;

FIG. 4 is a cut-away perspective view of a flap and spring, with the flap attached to the buttons on the rotating valve member;

FIG. 5 is a perspective view of the spring pushing against one flap;

FIG. 6 is a perspective view of one embodiment of a complete flap with exterior ribs, concave shape, and a cross piece for holding the spring; and FIG. 7 is a section through lines 7—7 in FIG. 6 showing a cross-section of the flap.

DETAILED DESCRIPTION OF THE PREFERRED EMBODIMENTS

The general configuration and features of the shut-off valve 1 are most clearly seen in FIGS. 1-3. A unitary cylindrical valve body 5 is covered by a valve top 10 and attached by screws 8. The body 5 and top 10, preferably plastic, generally define the interior chamber 13 of the valve 1. A gasket or o-ring 11 assists the sealing of the two parts. A typical two port valve would have two ports 6A, 6B that preferably extend outward from the body 5 and conduits 7A, 7B. An alternative embodiment is to provide the body with a third port 6C and conduit 7C. Ideally the interior of the conduit 7C is threaded, so that a male plug (not shown) can selectively be installed or removed.

In its simplest form, the water control mechanism of the valve 1 is a three piece valve means that rotates inside the valve chamber 13. A plastic circular member 15 rotates adjacent to the underside of top 10. Attached to the rotatable member 15 are rubber-like, flexible sealing flaps 20 and a biasing spring 25. In a typical device where two ports are disposed in collinear relation 180 degrees from each other, the flaps 20 are similarly disposed. Thus, member 15 can be rotated so that both flaps 20 cover the ports 6A, 6B, consequently preventing fluid flow through the chamber 13. Similarly, when the member 15 is rotated, the flaps 20 move with it, opening ports 6A, 6B and permitting flow through chamber 13.

The biasing spring 25 is fixed to the rotatable member 15 by placing the spring through slots 13 in member 15. The flaps 20 have holes 120 that fit over buttons 16 on the circular edge of member 15. With this arrangement, the ends 25A of spring 25 are always in contact with flaps 20 (FIGS. 4 & 5), urging those flaps outwardly from the interior 13 of the valve 1. When the flaps 20 are over the ports 6A, 6B, the ends 25A of spring 25 provide a positive sealing force that does not require the presence of fluid pressure.

The rotation of the valve member 15 is accomplished by handle 30 on the outside of valve 1. Handle 30 fits over a spindle 31 that is fixed to the center of member 15. The spindle 31 passes through opening 33 in top 10. A screw 34 secures spindle 31 to handle 30, so that handle 30 can rotate member 15. O-ring 35 seals valve top 10 against leakage from the interior chamber 13.

The rotation of member 15 is limited by stops 40 attached to the underside of top 10. The general shape of member 15 is circular, but the body of member 15 comprises a sector of approximately 220 degrees. The other 140 degrees have been eliminated, as depicted in FIG. 1. FIG. 1 shows the valve 1 in the closed position, with flaps 20 covering the ports generally designated 6. The edge of rotatable member 15 has encountered the left hand stop 40. To open the valve 1, handle 30 is rotated to the right or clockwise. This rotates member 15 which in turn rotates flaps 20 to uncover the ports 6. The rotation of right hand edge of member 15 would be stopped by the right hand stop 40. Stops 40 are preferably spaced approximately 60 degrees apart.

The present invention uses a remote push-pull cable to actuate the valve, which is located in the transom of a boat between a live well and outside drain. The cable typically is attached through a hole in handle 30. The force of the cable acts through a moment arm (handle 30) that passes through the axis of rotation. Thus a torque is produced about the pivot point of the valve. The efficiency of this actuation configuration coupled with the elimination of problems inherent in ball valves, permits the use of a lighter, less expensive cable mechanism.

The preloading biasing spring 25 and the shape of the flaps 20 are special features of the present invention. The biasing spring may be constructed from a single piece of steel and formed into the shape as shown (FIGS. 2, 4, 5) to accommodate the ports opposite each other. The material used is 300 series stainless steel strip 0.005 inches thick. The stainless steel, of course, is more suitable to a marine environment. Such a spring could also be used for a similar purpose in a slightly different configuration. With reference to U.S. Pat. No. 4,589,441 to Campau, the disclosure of which is incorporated herein by reference, a biasing spring or springs could be used to urge flexible flaps 62 and 64 into an improved sealing engagement with inlet 58 and outlet 60. As can be seen from a review of U.S. Pat. No. 4,589,441, the biasing spring would necessarily have a different configuration because corresponding flaps 62 and 64, are disposed at less than 180 degrees apart.

The configuration of the flaps 20 in the present invention is unique and greatly enhances the sealing of the valve 1. A flap is depicted in perspective in FIG. 6 and in cross section. A flap is typically composed of Kraton, a thermoplastic elastomer that is tough, easily processed, and maintains its flexibility through a wide temperature range. The flap is spherically molded with a radius of curvature R of 2.75 inches. Thus, the flap has a convex configuration which extends into chamber 13, which reduces the pressure necessary to seal the ports 6. The ribs 121 on the sides stiffen the flap so it does not deflect into and jam the port. Retaining bar 123 maintains the relationship between spring end 25A and the flap by virtue of the retaining slot 124. This is necessary because of the friction between the body 5 and the flaps 20 during the rotation of the valve. The ribs 121 also assist in maintaining the shape of the flap while it is moving during actuation of the valve. This feature becomes especially important when the valve is actuated under high flow conditions, because the fluid flow could deflect the flap 20 into a port 6 were it not for the ribs 121.

In addition the flap has a thickened circular center 122. Spring ends 25A bear on this section, which then distributes the sealing forces more uniformly than a thinner section would. The typical thickness of a flap is 0.05 inches. The dimensions designated in FIG. 7, in inches, are as follows:
X 0.100
Y 0.031
Z 0.060
R 2.75
The diameter of the circular increased bearing area is 0.50 inches.

It is notable that the present invention can be used in a variety of ways. For example, if a three port valve body is used, elimination of the biasing means and fixation of the two flaps in a closed position results in the three way double check valve used in my invention described in simultaneously filed copending application Ser. No. 195,811, which issued as U.S. Pat. No. 4,832,073, for a system for filling a baitwell.

The present shut-off valve could also be used effectively to control front and rear live wells with only one valve. With reference to FIG. 2, one port 6A would be connected to the rear well, with the center or third port 6C connected to the front well. The second port 6B would flow to a drain. The flaps 20 over ports 6A and 6B would also act as check valves, although it would be necessary to use a plug to keep the rear well from draining into the front well.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A shut-off valve for use in a low pressure fluid system, comprising:

a hollow body defining an interior chamber and having a top, a bottom and a cylindrical sidewall with at least two ports; and valve means for selectively permitting or preventing flow through said chamber, said valve means comprising a rotatable member adapted to carry thin, curved elastomeric flaps and cantilevered leaf springs for urging said flaps into sealing contact with said sidewall to thereby close said ports; and stops attached to said body top for limiting the rotation of said rotatable member.

2. The apparatus of claim 1 wherein said ports are substantially collinear and diametrically opposed on said sidewall.

3. The apparatus of claim 1 wherein said flaps include a retaining bar for securing said springs to said flaps so that said flaps travel with said springs when the valve is actuated.

4. The apparatus of claim 3 wherein said rotatable member includes slots for securing said springs.

5. The apparatus of claim 1 wherein said body includes a third port adapted to permit fluid flow and not to be closed by said flaps.

6. A shut-off valve for use in a low pressure fluid environment, comprising:
   a cylindrical body with two ports defining a valve chamber;
   rotatable valve means for controlling flow through said ports, said valve means comprising a rotatable member, flexible sealing flaps, and a leaf spring attached to said rotatable member for urging said flaps into sealing contact with said cylindrical body to seal said ports from said chamber; and
   wherein said flaps have convexly curved surfaces facing the interior of said valve chamber.

7. The valve of claim 6 wherein each of said flaps includes two lateral edges and at least one of said lateral edges of each of said flaps comprises a reinforcing rib.

8. In a low pressure flow control valve having a valve chamber defined by a top wall, a bottom wall and a sidewall having at least two ports communicating with said chamber, the improvement comprising:
   at least one thin elastomeric, convex-shaped sealing flap with ribbed side edges adapted to cover one of said ports to prevent flow from said chamber through said one port.

9. In flow control valve having a valve chamber defined by a top wall, a bottom wall and a cylindrical sidewall having at least two ports communicating with said chamber, the improvement comprising:
   at least one elastomeric, convex-shaped sealing flap adapted to cover one of said ports to prevent flow from said chamber through said one port wherein said sealing flap is urged against said sidewall by a leaf spring and said flap also includes a retaining bar for securing one end of said leaf spring.

* * * * *